United States Patent Office 2,792,393
Patented May 14, 1957

2,792,393
MERCURATED ALLYLTRIAZINES

Seymour L. Shapiro, Hastings on Hudson, and Louis Freedman, Mount Vernon, N. Y., assignors to U. S. Vitamin Corporation, a corporation of Delaware No Drawing. Application February 9, 1956, Serial No. 564,349

6 Claims. (Cl. 260—242)

This invention relates to mercurial derivatives of s-triazine. The derivatives are particularly useful as diuretics and the invention will be first illustrated, therefore, by description in connection with such use.

Certain mercurials have been used as diuretics. As such they have been found safe, dependable, and reasonably effective when used in the dosages prescribed.

We have now discovered new mercurials that, as compared to the mercurials previously used, are more effective as diuretics, even at lower dosage levels on the basis of mercury content. As a result, we obtain the desired diuresis with the administration of less actual mercury than heretofore required.

Briefly stated, the invention comprises the herein described mercurial derivatives of aminotriazine and particularly such derivatives of allyl and like unsaturated-aliphatic substituted amino-s-triazine.

In the commercial embodiment, the invention comprises the derivatives of the type formula

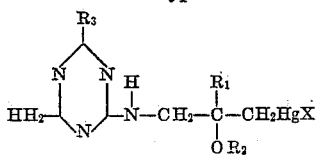

in which $R_1$, $R_2$ and $R_3$ represent hydrogen or the same or different lower alkyls and X represents a monovalent electronegative component. Examples of the alkyls that may be represented by the various R's are methyl, ethyl, and n-propyl, our components being more effective as diuretics when $R_2$ is either hydrogen or methyl. Examples of X are the halogens, particularly chlorine, and other monovalent electronegative components such as the following groups: hydroxyl, acetoxy, ascorbyl, theophyllino and its halogen substitution products, carbonylsalicylamide, and 8-methyl-carbonyl salicylamide.

In use our new compounds are recommended at dosage levels corresponding to ⅛–¼ of the dosage of mercury used in the previously accepted diuretics of this type. With such reduced dosages we have obtianed satisfactory results. With amounts equal to those administered with the previously used materials, we have collected up to twice or more the volume of urine excreted by test animals as compared to the volume with the usual diuretics.

The compositions of illustrative new derivatives that we have made, within the type formula above, are shown with their melting points (all with decomposition), formulas, and the analyses in Table 1.

TABLE 1

| No. | Components | | | | M. P., °C. | Formula | Analysis, Percent | | | | | |
|---|---|---|---|---|---|---|---|---|---|---|---|---|
| | | | | | | | Calculated | | | Found | | |
| | $R^1$ | $R^2$ | $R^3$ | X | | | C | H | N | C | H | N |
| 1 | H | $CH_3$ | H | $O-\overset{O}{\overset{\|}{C}}-CH_3$ | 173-81 | $C_9H_{15}N_5O_3Hg$ | 24.4 | 3.4 | 15.8 | 24.1 | 3.1 | 15.9 |
| 2 | H | $CH_3$ | H | Cl | 157-60 | $C_7H_{12}N_5OClHg$ | 20.1 | 2.9 | 16.7 | 18.9 | 3.0 | 16.7 |
| 3 | H | $CH_3$ | H | OH[a] | 170 | $C_7H_{13}N_5O_2Hg$ | 21.0 | 3.2 | 17.5 | 22.2 | 3.0 | 15.6 |
| 4 | H | $CH_3$ | H | Theoph.[b] | 117 | $C_{14}H_{19}N_9O_3Hg$ | 29.7 | 3.4 | 22.3 | 29.9 | 3.6 | 22.2 |
| 5 | H | $CH_3$ | H | $KF_2.2H_2O$ | 148 | $C_7H_{16}N_5O_3F_2KHg$ | 17.0 | 3.2 | 14.1 | 17.0 | 3.5 | 13.4 |
| 6 | H | $CH_3$ | H | Ascorbic[c] | 108 | $C_{13}H_{19}N_5O_7Hg$ | 28.0 | 3.4 | 12.5 | 27.2 | 3.4 | 12.7 |
| 7 | $CH_3$ | $CH_3$ | H | $O-\overset{O}{\overset{\|}{C}}-CH_3$ | 125 | $C_{10}H_{17}N_5O_3Hg$ | 26.4 | 3.7 | 15.3 | 25.84 | 3.8 | 14.7 |
| 8 | $CH_3$ | $CH_3$ | H | OH | 184 | $C_8H_{15}N_5O_2Hg$ | 23.2 | 3.6 | | 22.5 | 3.7 | |
| 9 | $CH_3$ | $CH_3$ | H | $KF_2.2H_2O$ | 115 | $C_8H_{18}N_5O_3F_2KHg$ | 18.8 | 3.5 | 13.7 | 18.7 | 3.5 | 13.7 |
| 10 | $CH_3$ | $CH_3$ | H | $Theoph.2H_2O$ | 108 | $C_{15}H_{25}N_9O_3Hg$ | 29.3 | 4.1 | 20.5 | 29.0 | 4.2 | 21.3 |
| 11 | H | $C_2H_5$ | H | OH | 169 | $C_8H_{15}N_5O_2Hg$ | 23.2 | 3.6 | | 22.9 | 3.2 | |
| 12 | H | $n-C_3H_7$ | H | OH | 137 | $C_9H_{17}N_5O_2Hg$ | 25.2 | 4.0 | | 24.4 | 3.8 | |
| 13 | H | $n-C_3H_7$ | H | Theoph. | 182 | $C_{16}H_{23}N_9O_3Hg$ | 32.6 | 3.9 | | 31.8 | 4.1 | |
| 14 | H | $n-C_3H_7$ | H | Br | 168 | $C_9H_{16}N_5OBrHg$ | | | 14.3 | | | 14.1 |
| 15 | H | $CH_3$ | H | 8-Me C. S. A.[d] | 108 | $C_{15}H_{18}N_6O_4Hg$ | 34.4 | 3.2 | | 35.4 | 3.6 | |
| 16 | H | H | H | $O-\overset{O}{\overset{\|}{C}}-CH_3$ | 127 | $C_8H_{13}N_5HgO_3$ | | | 16.3 | | | 16.0 |
| 17 | H | $CH_3$ | $CH_3$ | $O-\overset{O}{\overset{\|}{C}}-CH_3$ | 146 | $C_{10}H_{17}N_5O_3Hg$ | 26.4 | 3.8 | 15.4 | 25.0 | 3.5 | 14.8 |
| 18 | H | $CH_3$ | H | C. S. A.[e] | 113 | $C_{15}H_{18}N_6O_4Hg$ | | | 15.5 | | | 15.6 |
| 19 | H | H | H | Cl | 191 | $C_6H_{10}N_5OClHg$ | | | f 8.8 | | | 8.9 |
| 20 | H | H | H | Theoph. | 129 | $C_{13}H_{17}N_9O_3Hg$ | 28.4 | 3.1 | 23.0 | 30.6 | 3.9 | 23.0 |
| 21 | H | $C_2H_5$ | H | $O-\overset{O}{\overset{\|}{C}}-CH_3$ | 122 | $C_{10}H_{17}N_5O_3Hg$ | 26.3 | 3.8 | 15.4 | 24.8 | 3.4 | 15.4 |
| 22 | H | $CH_3$ | $CH_3$ | Cl | 179 | $C_8H_{14}N_5OClHg$ | | | f 8.2 | | | 8.5 |
| 23 | H | $CH_3$ | $CH_3$ | Theoph. | 124 | $C_{15}H_{21}N_9O_3Hg$ | 31.3 | 3.7 | 21.9 | 30.5 | 3.9 | 21.8 |
| 24 | H | H | $CH_3$ | $O-\overset{O}{\overset{\|}{C}}-CH_3$ | 132 | $C_9H_{15}N_5O_3Hg$ | 24.5 | 3.4 | | 24.3 | 3.8 | |
| 25 | H | H | $CH_3$ | Cl | 212 | $C_7H_{12}N_5OClHg$ | 20.1 | 2.9 | 16.7 | 20.0 | 3.2 | 16.1 |
| 26 | H | H | $CH_3$ | Br | 209 | $C_7H_{12}N_5OBrHg$ | | | g 17.3 | | | 18.1 |
| 27 | H | H | $CH_3$ | Theoph. | 117 | $C_{14}H_{19}N_9O_3Hg$ | 29.9 | 3.4 | | 31.4 | 4.0 | |
| 28 | H | $C_2H_5$ | H | Theoph. | 110 | $C_{15}H_{21}N_9O_3Hg$ | | | 21.9 | | | 21.6 |

Footnotes at end of column 3.

USE OF DIURETICS

Diuretic potency has been established by intravenous injection at a level of 0.5 mg. of mercury per kilogram of weight of animal tested, except as noted. Six dogs were used for evaluation of each compound. The dogs were dehydrated for 24 hours and catheterized just previous to testing. They were then force-fed 0.9% saline solution at the level of 25 ml./kg. dog, and the compound administered. The volume of urine voided was collected at 2.5 hours and at 5 hours. The excretion, expressed as percentage diuresis, was calculated on the basis of the following formula Percent diuresis =

$$\frac{\text{volume of urine collected at } x \text{ hours}}{\text{volume of saline administered at 0 hours}} \times 100$$

Each result tabulated in Table 2 is the average for the six dogs used for each test compound. The numbers for the same compounds correspond to those in Table 1.

TABLE 2

| Compound No. | Percent Diuresis | |
|---|---|---|
| | 2.5 hours | 5 hours |
| Control (no Hg) | 34 | 43 |
| Mercurophylline | 29.3 | 47.5 |
| 1 | 54 | 62 |
| 2 | 115 | 129 |
| 4 | 90 | 119 |
| 5 | 70 | 81 |
| 10 | 82 | 106 |
| 15 | 96 | 104 |
| 16 | 70 | 79 |
| 18 | 90 | 99 |
| 19 (0.25 mg./kg. dog) | 28 | 59 |
| 20 | 70 | 89 |
| 21 | 79 | 92 |
| 22 (0.25 mg./kg. dog) | 34 | 50 |
| 27 (0.25 mg./kg. dog) | 58 | 82 |
| 28 | 60 | 64 |

GENERAL PROCESS OF PREPARATION OF THE MERCURIAL DERIVATIVES

In general, we react the selected alkenyl substituted 2-amino-s-triazine with mercuric acetate or like mercuric salt in an alcohol or water medium acidified with a weak acid such as acetic acid. The mixture is stirred and heated until the finished reaction is complete, generally overnight. At this point, the desired mercurial derivative is either separated by filtration (in case it is a precipitate) or by evaporation of the remaining liquid such as excess of alcohol and water.

The values of $R_1$ and $R_3$ in the type formula will be determined by the components at those positions in the substituted triazine compound used as the starting material.

--- a Due to insolubility of this intermediate in virtually all solvents, it was not possible to obtain an analytically pure product, but as will be noted in subsequent examples it yielded satisfactory derivatives of desired compounds.
b Theophylline—the point of attachment is considered to be through the acidic nitrogen in the 7 position.
c Ascorbyl derivative—point of attachment not established.
d 8-methyl carbonyl salicylamide.

e Carbonyl salicylamide.

f Chlorine.
g Bromine

---

$R_2$, on the other hand, will be determined by the liquid medium in which the reaction described is conducted. If the medium is an alcohol, $R_2$ will be the alkyl radical of that alcohol. When the medium is water, then $R_2$ will be hydrogen.

In the resultant compound X is the acetate or oxyacetyl group ($CH_3 \cdot COO-$). The X may be changed to another electronegative component. Thus, reaction with sodium chloride yields the compound wherein X equals Cl. Reaction with theophylline introduces the theophyllino group at X. Ordinarily, the X is varied by reaction with a compound such as a salt. The anion initially associated with the metal of the salt used replaces the original X and the metal combines with the original X. In the reaction of theophylline and its halo substitution compounds, the theophyllino group is sufficiently negative to displace the acetate group X in the formula. In this case, the acetate group X goes to acetic acid.

The purity is controlled by use of starting materials of good quality and also by washing the finished, separated mercurial derivative with solvent, as for instance acetone. Recrystallization of the finished product is difficult and for that reason the analyses do not agree in a few instances with the calculated percentages as closely as might be desired.

A typical s-triazine in which all R's are H and the alkenyl substitutent is allyl is as follows:

The reaction with the mercuric acetate $HgAc_2$, an abbreviation for $Hg(OOC \cdot CH_3)_2$, and methanol, for example, involves the allyl group, thus, $$-CH_2-CH=CH_2 + HgAc_2 + CH_3OH \longrightarrow$$
$$-CH_2-CH-CHHgAc + HAc$$
$$\quad\quad\quad |$$
$$\quad\quad OCH_3$$

Reaction of the products with a salt such as sodium chloride causes the following type of change $$-CHHgAc + NaCl \rightarrow CHHgCl + NaAc$$

The invention will be further illustrated by detailed description of the preparation of each of the derivatives of the tables above. In these examples and elsewhere herein, proportions are expressed as parts by weight unless stated specifically to the contrary. Also, the techniques of the steps of preparation may be the usual ones except where the materials and techniques are specifically stated. All temperatures herein are stated in °C.

*Example 1.—2-amino-N-4-(3'-acetoxymercuri-2'-methoxypropyl)amino-s-triazine*

To a solution of 9.0 g. of 2-amino-N-4-allylamino-s-triazine dissolved in 90 ml. of methanol was added a hot solution of 16.8 g. of mercuric acetate in 3 ml. of glacial acetic acid and 42 ml. of methanol. The reaction mixture was stirred and refluxed overnight, then cooled, and the white precipitate of product was separated, rinsed with acetone and dried in the vacuum desiccator over phosphorus pentoxide. Yield, 15.0 g. (57% of theory).

*Example 2.—2-amino-N-4-(3'-chloromercuri-2'-methoxypropyl)amino-s-triazine*

To a solution of 3.0 g. of 2-amino-N-4-allylamino-s-triazine in 10 ml. of methanol and 0.4 ml. of water was added a hot solution of 5.6 g. of mercuric acetate in one ml. of glacial acetic acid and 14 ml. of methanol. After refluxing 15 minutes, an additional 20 ml. of methanol was added and the solution refluxed overnight and filtered hot. A solution of dimethylamine hydrochloride in methanol was added yielding a white precipitate of the product. Addition of 200 ml. of acetone precipitated an additional quantity of product. The resultant precipitate was filtered, rinsed with acetone and dried in the desiccator over concentrated sulfuric acid. Yield, 3.7 g. (44%).

The product of this example is also readily prepared using an aqueous methanolic solution of the product of Example 1 and adding an equivalent quantity of sodium chloride as a saturated aqueous solution. The precipitated product which forms is filtered, washed and dried as above.

*Example 3.—2-amino-N-4-(3'-hydroxymercuri-2'-methoxypropyl)amino-s-triazine*

To a solution of 9.0 g. of 2-amino-N-4-allylamino-s-triazine in 30 ml. of hot methanol was added a hot solution of 16.8 g. of mercuric acetate in 3 ml. of acetic acid and 42 ml. of methanol. An additional 60 ml. of methanol was added and the reaction mixture was refluxed for 15½ hours. After cooling the reaction mixture was filtered. A solution of 6.5 g. of sodium hydroxide in 40 ml. of methanol was added, yielding a copious white precipitate. The product was filtered, and dried, yielding 22.9 g. (95%).

*Example 4. — 2-amino-N-4-(3'-[7-theophyllino]mercuri-2'-methoxypropyl)amino-s-triazine*

To the gummy suspension of 8.0 g. of 2-amino-N-4-(3'-hydroxymercuri-2'-methoxypropyl)amino - s - triazine in 100 ml. of water, 3.6 g. of theophylline was added portionwise in powder form with vigorous stirring and trituration. When all of the theophylline had been added, virtually complete solution of the components of the reaction mixture was obtained. Carbon was added. After about 30 minutes, the solution was filtered, yielding a colorless filtrate. The water was removed from the filtrate by vacuum distillation at 10 mm. pressure. The syrup which remained was placed in a vacuum desiccator over phosphorus pentoxide yielding a white powder which was finely powdered and dried further under above conditions, yielding 11.0 g. (98%).

The product of this example is also readily prepared using as a source material the pure starting material of Example 1.

Three grams of 2-amino-N-4-(3'-acetoxymercuri-2'-methoxypropyl)amino-s-triazine was added portionwise to a suspension of 1.28 g. of anhydrous theophylline in 25 ml. of water. As the compound is formed, complete solution is effected. The reaction mixture was filtered to remove traces of insoluble material. The water was removed from the filtrate by vacuum distillation, and the white residue of product slurried with acetone, filtered off and dried. Yield 3.25 g. (83%).

This compound is a particularly satisfactory diuretic. One gram dissolves in less than 1 ml. of water.

*Example 5.—2-amino-N-4-(3'-fluoromercuri-2'-methoxypropyl)amino-s-triazine potassium fluoride dihydrate*

To a gummy suspension of 6.4 g. of 2-amino-N-4-(3'-hydroxymercuri-2-methoxypropyl)amino-s-triazine in 20 ml. of water was added portionwise 1.4 g. of solid potassium acid fluoride (KHF$_2$). After trituration and stirring and standing for 1 hour, the components of the reaction mixture were substantially dissolved. Carbon was added and the solution filtered. The filtrate was concentrated and the water removed at 10 mm. pressure, yielding a yellow syrup. After the syrup had been transferred to a vacuum desiccator and maintained over phosphorus pentoxide for 15 hours, a yellow solid was obtained which was triturated with 70 ml. of acetone. The resulting light yellow powder was dried under above conditions to yield 6.1 g. (68%) of product.

*Example 6.—2-amino-N-4-(3'-ascorbylmercuri-2'-methoxypropyl)amino-s-triazine*

To a gummy suspension of 6.4 g. of 2-amino-N-4-(3'-hydroxymercuri-2'-methoxypropyl)amino-s-triazine in 20 ml. of water was added portionwise 3.17 g. of ascorbic acid. After 1 hour, during which interval the undissolved material was mechanically triturated, solution was effected. The reaction mixture was treated with carbon and filtered. The filtrate was concentrated and the water removed at 10 mm. pressure, yielding a yellow solid. The solid was dried in the vacuum desiccator over phosphorus pentoxide. It was then triturated with 70 ml. of acetone and dried further as above. There was obtained 7.7 g. (77%) of a white solid.

*Example 7.—2-amino-N-4-(3'-acetoxymercuri-2'-methyl-2'-methoxypropyl)amino-s-triazine*

A solution of the required 2-amino-N-4-methallylamino-s-triazine was prepared from methallyl-amine hydrochloride, dicyandiamide, and ethyl formate. The hydrochloride (0.2 mole) is ground together with the dicyandiamide (0.2 mole) and heated to 150°–160° C. until the reaction is substantially complete. The reaction product is cooled and dissolved in 100 ml. of methanol. This solution is filtered. To the clear filtrate there is added a solution of sodium (0.15 atom) in methanol (100 ml.). The solution is then cooled and mixed with ethyl formate (0.19 mole) and allowed to stand at room temperature overnight. This causes formylation with loss of water and the production of the s-triazine derivative desired. The cooled material so made is crystallized and then recrystallized from acetonitrile or other suitable solvent.

The triazine so prepared, 9.86 g., was dissolved in 30 ml. of methanol to which was added a hot solution of 18.8 g. of mercuric acetate in 3 ml. of acetic acid and 42 ml. of methanol. An additional 60 ml. of methanol was added and the solution refluxed for 19 hours. The cooled solution was filtered and concentrated in vacuum, to yield a hygroscopic, gummy residue which was dried in the vacuum desiccator over phosphorus pentoxide. The resultant solid was powdered by trituration with 200 ml. of acetone, filtered and then dried as above, yielding 21.1 g. (79%).

*Example 8.—2-amino-N-4(3'-hydroxymercuri-2'-methyl-methoxypropyl)amino-s-triazine*

A solution of 21.1 g. of 2-amino-N-4(3'-acetoxymercuri - 2' - methyl - 2' - -methoxypropyl)amino - s - triazine in 75 ml. methanol was prepared, carbon added, and the solution filtered. To this chilled solution was added 19 ml. of methanolic sodium hydroxide (10 g. of NaOH in 77 ml. of methanol). The white precipitate which formed was filtered off, dried in the vacuum desiccator over phosphorus pentoxide, slurried with acetone, filtered, and dried as above. There was obtained 16.9 g. (90%) of a light grey solid.

*Example 9.—2-amino-N-4(3'-fluoromercuri-2'-methyl-2'-methoxypropyl)amino-s-triazine-potassium fluoride dihydrate*

To a gummy suspension of 8.3 g. of 2-amino-N-4-(3'-hydroxymercuri - 2' - methyl - 2' - methoxypropyl)amino-s-triazine in 40 ml. of water was added portionwise with stirring and trituration 1.56 g. of potassium acid fluoride. After 1 hour, when solution was virtually complete, carbon was added, and the solution filtered. The clear, light yellow filtrate was concentrated in vacuum at 10 mm. to remove the water, yielding a white solid. The solid was dried in the vacuum desiccator over phosphorus pentoxide, then triturated with 60 ml. of acetone, and dried as above. There was obtained 8.3 g. (81%) of product.

*Example 10.—2-amino-N-4-(3'-[7-theophyllino]mercuri-2'-methyl-2'-methoxypropyl)amino-s-triazine dihydrate*

To a gummy suspension of 8.3 g. of 2-amino-N-4-(3'-hydroxymercuri - 2' - methyl - 2' - methoxypropyl)amino-s-triazine in 40 ml. of water was added portionwise with stirring and trituration 3.6 g. of theophylline. After 1 hour, when solution was virtually complete, carbon was added, and the solution filtered. The clear light yellow filtrate was concentrated in vacuum at 10 mm. to remove the water, and the residue triturated with 70 ml. of acetone to yield a white solid which was dried in the vacuum desiccator over phosphorus pentoxide. There was obtained 10.3 g. (84%) of product.

*Example 11.—2-amino-N-4-(3'-hydroxymercuri-2'-ethoxypropyl)amino-s-triazine*

A solution of 4.5 g. of 2-amino-N-4-allylamino-s-triazine in 30 ml. of ethanol was treated with a hot solution of 8.4 g. of mercuric acetate in 1.5 ml. of acetic acid and 20 ml. of ethanol. The reaction mixture was refluxed for 16 hours, then cooled, carbon added, and filtered. The filtrate was chilled with an ice-bath and a solution of 3.2 g. of sodium hydroxide in 40 ml. of ethanol was added with continued cooling and stirring, yielding a copious white precipitate. The white solid was separated by filtration, and dried in the vacuum desiccator over phosphorus pentoxide. Yield, 11.8 g. (95%).

*Example 12.—2-amino-N-4-(3'-hydroxymercuri-2'-propoxypropyl)amino-s-triazine*

To a solution of 9 g. of 2-amino-N-4-allyl-amino-s-triazine in 50 ml. of hot propanol was added 16.8 g. of mercuric acetate in 3 ml. of acetic acid and 35 ml. of propanol, and the solution refluxed 16 hours. At this point a small amount of precipitate formed. An additional 80 ml. of propanol was added and the reaction mixture refluxed an additional half hour. The reaction mixture was filtered hot, yielding 190 ml. of filtrate containing 2-amino-N-4-(3'-acetoxymercuri-2'-propoxypropyl)amino-s-triazine. Fifty-eight ml. of this filtrate were chilled in an ice bath and a solution of 1.4 g. of sodium hydroxide in 17 ml. of methanol was added slowly with continued cooling and stirring. The white precipitate which formed was collected by filtration and dried in the vacuum desiccator over phosphorus pentoxide. The yield was 2.7 g. (35%) of a white solid.

*Example 13.—2-amino-N-4(3'-[7-theophyllino]mercuri-2'-propoxypropyl)amino-s-triazine*

To a gummy suspension of 1.4 g. of 2-amino-N-4(3'-hydroxymercuri-2'-propoxypropyl)amino-s-triazine in 18 ml. of water was added, portionwise with stirring and trituration, 0.63 g. of theophylline. After 30 minutes virtually complete solution was obtained. The reaction mixture was treated with carbon and filtered. The water was removed from the filtrate under reduced pressure. The solid residue was dried in the desiccator over phosphorus pentoxide, yielding 1.5 g. (72%) of white solid.

*Example 14.—2-amino-N-4(3'-bromomercuri-2'-propoxypropyl)amino-s-triazine*

To 45 ml. of the solution of 2-amino-N-4(3'-acetoxymercuri - 2' - propoxypropyl) - amino - s - triazine, prepared under Example 12, was added with stirring a solution of 1.02 g. of sodium bromide in 5 ml. of water. The light yellow precipitate which formed was filtered off and dried in the desiccator, yielding 1.0 g. of solid. The light yellow solid was slurried with 4:1 acetone:water, filtered and dried in the desiccator over phosphorus pentoxide, yielding 0.7 g. (10%).

*Example 15.—2-amino-N-4-(3'-3-8-methylcarbonylsalicylamidomercuri-2'-methoxypropyl)amino-s-triazine*

The required 8-methylcarbonylsalicylamide was prepared from 3-methylsalicylamide and ethylchloroformate in pyridine and acetonitrile as solvents, with 96% yield. M. P. 210–12°.

*Analysis.*—Calcd. for $C_9H_7O_3$: C, 61.01; H, 3.98; N, 7.91. Found: C, 61.19; H, 4.20; N, 7.75.

Three grams of 2-amino-N-4-(3'-acetoxymercuri-2'-methoxypropyl)amino-s-triazine were added portionwise to a suspension of 1.27 g. of 8-methylcarbonylsalicylamide in 75 ml. of water and 30 ml. of ethanol, and the reaction mixture warmed gently to about 60° C. The reaction mixture was filtered to remove traces of insoluble material. The filtrate was concentrated in vacuum to a thick syrup which was dried in the desiccator and then triturated with acetone, and redried in the desiccator over phosphorus pentoxide. Yield, 2.9 g. (74%).

*Example 16.—2 - amino - N - 4 - (3' - acetoxymercuri - 2'-hydroxypropyl)amino-s-triazine*

To a stirred solution of 5.6 g. of mercuric acetate and 1 ml. of acetic acid and 45 ml. of water, there was added portionwise 3.0 g. of 2-amino-N-4-allylamino-s-triazine. The reaction mixture was maintained at room temperature overnight and then filtered to separate traces of insoluble matter. The clear filtrate was evaporated to dryness under vacuum and the solid white residue triturated with acetone, separated by filtration and dried in the desiccator over phosphorus pentoxide. Yield, 6.4 g. (75%).

*Example 17.—2 - amino - N - 4 - (3' - acetoxymercuri - 2'-methoxypropyl)-6-methyl-s-triazine*

The required 2-amino-N-4-allylamino-6-methyl-s-triazine was prepared by mixing allylbiguanide and acetylchloride in cold aqueous alkaline acetonitrile. M. P. 118–19°.

*Analysis.*—Calcd. for $C_7H_{11}N_5$: C, 50.89; H, 6.71; N, 42.40. Found: C, 51.09; H, 6.81; N, 42.30.

This product was further characterized by conversion to the picrate, M. P. 187–89°.

*Analysis.*—Calcd. for $C_{13}H_{14}N_8O_7$: C, 39.5; H, 3.6. Found: C, 40.4; H, 3.8.

To a solution of 3.3 g. of 2-amino-N-4-allylamino-6-methyl-s-triazine in 20 ml. of hot methanol was added a hot solution of 6.4 g. of mercuric acetate in 14 ml. of methanol and 1 ml. of glacial acetic acid. The reaction mixture was refluxed with stirring for 6 hours. After cooling the reaction mixture was filtered to separate traces of insoluble matter and the filtrate evaporated to dryness in vacuum. The white residue of the product was triturated with 100 ml. of acetone, separated by filtration and dried in the vacuum desiccator over phosphorus pentoxide. Yield, 7.8 g. (86%).

DIURETIC COMPOSITION

For use as a diuretic our new compounds are extended or diluted in such manner as to decrease the concentration of the active mercury compound per unit of volume. For intravenous injection, sterile aqueous solutions of the active diuretics are made by dissolving the diuretics in sterile distilled water and passing the solutions so made through a bacterial filter. The solution may be made substantially isotonic, as by choice of concentration of the diuretic or by including any inert, non-toxic ingredient commonly introduced, for osmotic pressure effect, into the system, provided the said ingredient is chemically inactive towards the diuretic used.

In case the composition is to be administered orally, then it is mixed with solid extenders and tableted. Thus we mix the active mercurial with a solid non-toxic edible and chemically inert excipient. Examples of excipients that illustrate the class to be used and that are satisfactory are lactose, sucrose, starch, pregelatinized starch, gum arabic and like gums, and starch conversion syrup solids. The mixture to be tableted may contain parting agents of usual non-toxic type to facilitate separation of the composition from the mold mechanism. Suitable proportions of the excipient are 0.05–5 parts for 1 part of the active diuretic.

It is to be understood that it is intended to cover all changes and modifications of the examples of the invention herein chosen for the purpose of illustration which do not constitute departures from the spirit and scope of the invention.

The invention claimed is:

1. A compound of the formula

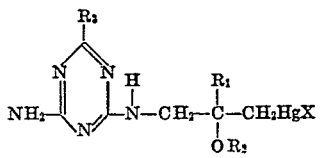

in which $R_1$, $R_2$, and $R_3$ represent a component selected from the group consisting of hydrogen and lower alkyl groups and X represents the monovalent residue of a substance less an acidic hydrogen, the said substance being selected from the group consisting of hydrohalide acids, theophylline, and 8-methyl-carbonylsalicylamide.

2. The compound of claim 1 in which $R_1$ and $R_3$ represent hydrogen, $R_2$ represents methyl, and X represents chlorine.

3. The compound of claim 1 in which $R_1$ and $R_3$ represent hydrogen, $R_2$ represents methyl, and X represents theophyllino.

4. The compound of claim 1 in which $R_1$ and $R_3$ represent hydrogen, $R_2$ represents methyl, and X represents 8-methyl carbonylsalicylamide.

5. The compound of claim 1 in which $R_1$ and $R_2$ represent methyl groups, $R_3$ represents hydrogen, and X represents theophyllino.

6. The compound of claim 1 in which $R_1$ and $R_2$ represent hydrogen, $R_3$ represents methyl, and X represents theophyllino.

No references cited.